(12) United States Patent
Garst et al.

(10) Patent No.: US 7,305,538 B2
(45) Date of Patent: Dec. 4, 2007

(54) TRANSPARENT LOCAL AND DISTRIBUTED MEMORY MANAGEMENT SYSTEM

(75) Inventors: Blaine Garst, Belmont, CA (US); Ali Ozer, Redwood City, CA (US); Bertrand Serlet, San Francisco, CA (US); Trey Matteson, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 791 days.

(21) Appl. No.: 10/410,768

(22) Filed: Apr. 10, 2003

(65) Prior Publication Data

US 2003/0196063 A1   Oct. 16, 2003

Related U.S. Application Data

(63) Continuation of application No. 09/978,836, filed on Oct. 15, 2001, now Pat. No. 6,571,262, which is a continuation of application No. 09/504,664, filed on Feb. 14, 2000, now Pat. No. 6,304,884, which is a continuation of application No. 08/967,395, filed on Nov. 11, 1997, now Pat. No. 6,026,415, which is a continuation of application No. 08/381,715, filed on Jan. 31, 1995, now Pat. No. 5,687,370.

(51) Int. Cl.
*G06F 12/00* (2006.01)

(52) U.S. Cl. .................. 711/170; 711/159; 707/206; 709/315

(58) Field of Classification Search ............... None
See application file for complete search history.

(56) References Cited

U.S. PATENT DOCUMENTS 4,755,939 A   7/1988   Watson (Continued)

FOREIGN PATENT DOCUMENTS

EP   0 582 378   2/1994

OTHER PUBLICATIONS

Smith et al., Flamingo: Window Management for Distributed Systems, Proceedings of the Second International Conference on Computers and Applications, Beijing (Peking), Peoples' Republic of China, Jun. 23-27, 1987, pp. 111-117, vol. 2, IEEE Computer Society Press, USA.

(Continued)

*Primary Examiner*—Mano Padmanabhan
*Assistant Examiner*—Kaushik Patel
(74) *Attorney, Agent, or Firm*—Hickman Palermo Truong & Becker LLP (57) ABSTRACT

The present invention discloses a system for transparent local and distributed memory management. The invention overcomes the prior art's requirement of keeping track of whether a memory space allocated to a new object or a new program or data structure can be reclaimed. According to the present invention an autorelease pool is created at the beginning of a new duty cycle. The autorelease pool retains the newly allocated memory space during the duty cycle. The autorelease pool is automatically disposed of at the end of the duty cycle. As a result of disposing the autorelease pool, the newly allocated memory space is reclaimed (i.e., deallocated). The present invention is useful in distributed networks where different programming conventions on remote and local machines made the prior art's memory management task particularly difficult. The present invention is also useful in an object-oriented programming environment.

18 Claims, 8 Drawing Sheets

U.S. PATENT DOCUMENTS

| | | |
|---|---|---|
| 4,775,932 A | 10/1988 | Oxley et al. |
| 5,218,698 A | 6/1993 | Mandl |
| 5,274,804 A | 12/1993 | Jackson et al. |
| 5,321,834 A | 6/1994 | Weiser et al. |
| 5,355,483 A | 10/1994 | Serlet |
| 5,432,924 A | 7/1995 | D'Souza et al. |
| 5,446,901 A | 8/1995 | Owicki et al. |
| 5,481,721 A | 1/1996 | Serlet et al. |
| 5,485,613 A | 1/1996 | Engelstad et al. |
| 5,491,808 A * | 2/1996 | Geist, Jr. .................... 711/100 |
| 6,912,637 B1 * | 6/2005 | Herbst ........................ 711/167 |

OTHER PUBLICATIONS

McCullough, P.L., Transparent Forwarding: First Steps, Proceedings of the OOPSLA'87 Conference, Orlando, Florida, Oct. 4-8, 1987, Special Issue of SIGPLAN Notices, pp. 331-341, vol. 22, No. 12, ACM Press, USA.

Mancini et al., Fault-tolerant Reference Counting for Garbage Collection in Distributed Systems, The Computer Journal, Dec. 1, 1991, pp. 503-513, vol. 34, No. 6, Oxford University Press, Surrey, Great Britain.

* cited by examiner

TRANSPARENT LOCAL AND DISTRIBUTED MEMORY MANAGEMENT SYSTEM

BACKGROUND OF THE PRESENT INVENTION

This is a continuation of application Ser. No. 09/978,836 filed Oct. 15, 2001 now U.S. Pat. No. 6,571,262; which is a continuation of application Ser. No. 09/504,664, filed Feb. 14, 2000, now U.S. Pat. No. 6,304,884; which is a continuation of application Ser. No. 08/967,395, filed Nov. 11, 1997, now U.S. Pat. No. 6,026,415; which is a continuation of application Ser. No. 08/381,715, filed Jan. 31,1995, now U.S. Pat No. 5,687,370.

1. Field of the Invention

This invention relates to the field of object-oriented programming and distributed computing.

2. Background Art

Object-oriented programming is a method of creating computer programs by combining certain fundamental building blocks, and creating relationships among and between the building blocks. The building blocks in object-oriented programming systems are called "objects." An object is a programming unit that groups together a data structure and the operations (methods, or procedures) that can use or affect that data. Thus, an object consists of data and one or more operations or procedures that can be performed on that data. An object can be instructed to perform one of its methods when it receives a "message." A message is a command or instruction to the object to execute a certain method. It consists of a method selection (name of the method) and arguments (values to be assigned to the variables within the object). A message tells the receiving object what to do.

A disadvantage of the prior art object-oriented programming systems is that all objects are required to exist in a single program or process. This prohibits utilizing an object-oriented programming system when writing distributed applications. In addition, these prior art limitations prevent the creation of applications that are distributed physically over networks of machines. One prior art method for providing distributed object-oriented programming is described in "Design of a Distributed Object Manager for the SmallTalk-80 System," D. Decouchant, OOPSLA 86 Proceedings, September, 1986,pp. 444–452. The Decouchant reference describes the design of a distributed object manager that allows several SmallTalk-80 systems to share objects over a local area network. When a local object desires to communicate with a remote object, the local object communicates with a "proxy" that locally represents the remote object. The proxy has two fields that describe a remote object, namely, the resident site of the remote object and a pointer to the object in the resident site. If the referenced object migrates, the contents of the referencing object are not modified. The proxy is updated accordingly by the object manager. In this implementation, a proxy is functionally equivalent to a Unix link, except that a proxy is not visible to the programmer. It is a private data structure which is handled by the object manager like other Small-Talk objects. In U.S. patent application entitled "method for providing automatic and dynamic translation of language-based message passing into operating system message passing," Ser. No. 07/731,636 filed on Jul. 17, 1991,assigned to the assignee of the present application, and hereby incorporated fully be reference into the present application, a method using proxies for overcoming the prior art difficulties with distribution of objects in different processes has been disclosed. As disclosed in that application, a proxy acts as a local receiver for all objects in a local program. When a proxy receives a message, the message is encoded and transmitted between programs as a stream of bytes. The use of proxies, as disclosed in that application, accommodate distributed programming in an object-oriented environment.

In local or distributed object programming environments, objects are constantly creating and disposing of other objects. Much of the time an object creates other objects for its private use and then disposes of them as it needs. However, when for example through invocation of a source object's method, the source object creates and passes an object to a destination object, the lines of ownership—and responsibility for disposal blur. Suppose, for example, that in an Objective C environment an object called Gadget contains a number of objects called Widgets, and that an object called Request wishes to access the Widget objects by invoking the method: —(NSArray *) Widgets. This invocation causes memory space to be allocated to, for example, copies of the Widget objects for use by the Request object. However, this method does not address whether the Gadget object or the Request object should keep track and dispose of the memory space allocated to the Widget objects after the Request object is done with the Widget objects.

A convention can be made that either the source object, i.e. the Gadget object, or the destination object, i.e. the Request object, is responsible for disposing the created object, i.e. the Widget object. Any such convention, however, requires the programmer to keep track of a complex web of objects that are constantly created in response to invocation of various methods. Any such convention also presents other difficulties. For example, in a distributed processing environment the source object may reside in a local machine and the destination object may reside in a remote machine. In that case, the remote machine may run a process that does not have the same programming conventions as the local process. For example, the remote process may run on a different programming language than that of the local process. In such a situation, it is very difficult for a programmer of the local machine to keep track and dispose of objects that are created for the remote machine. One problem is that the local source object needs to know when the destination object is done with the created object since it is clearly inappropriate to dispose of the created object while it is still being used by the destination object. On the other hand, it is difficult to keep track of every destination object of the remote machine and to send messages to the destination objects for disposal of objects that are no longer needed, especially if the programming environments of the remote and local machines are different. In any event, any conventional attempt at resolving the problem of reclaiming memory space involves active programmer involvement in the difficult and complex task of reclaiming memory space allocated to objects created in the course of running a program.

One known attempt in automatic deallocation of the memory assigned to objects that are no longer needed is referred to as "garbage collection." However, it is difficult to provide garbage collection in a machine-independent form in languages (such as C-based languages) in which garbage collection is not built in. In addition, garbage collection is unpredictable and may occur without programmer control since a general garbage collection routine is activated by a single request that can be generated at any instant. In addition, present garbage collection methods might miss certain classes of deallocated objects.

Thus, there is need in the art for an effective and efficient method for reclamation of memory space allocated, for example to objects in an object-oriented programming environment. In particular, there is need for an effective and efficient way for reclaiming memory space in a distributed process environment where objects created in a local machine are passed on to a destination object residing in a remote machine. Moreover, there is a need for a method to transparently, i.e. without actively involving the programmer, reclaim memory space allocated to objects created during the course of running a program.

SUMMARY OF THE INVENTION

The present invention discloses a system for transparent local and distributed memory management. The invention overcomes the prior art's requirement of keeping track of whether a memory space allocated to a new object or a new program or data structure can be reclaimed. According to the present invention an autorelease pool is created at the beginning of a new duty cycle. The autorelease pool retains the newly allocated memory space during the duty cycle. The autorelease pool is automatically disposed of at the end of the duty cycle. As a result of disposing the autorelease pool, the newly allocated memory space is reclaimed (i.e., deallocated). The present invention is useful in distributed networks where different programming conventions on remote and local machines made the prior art's memory management task particularly difficult. The present invention is also useful in an object-oriented programming environment.

DETAILED DESCRIPTION OF THE INVENTION

A system for transparent local and distributed memory management is described. In the following description, numerous specific details, such as object-oriented programming language, operating system, etc., are set forth in order to provide a more thorough understanding of the present invention. It will be apparent, however, to one skilled in the art, that the present invention may be practiced without these specific details. In other instances, well known features have not been described in detail so as not to obscure the present invention.

Computer System for Implementing the Present Invention

Figure 1:
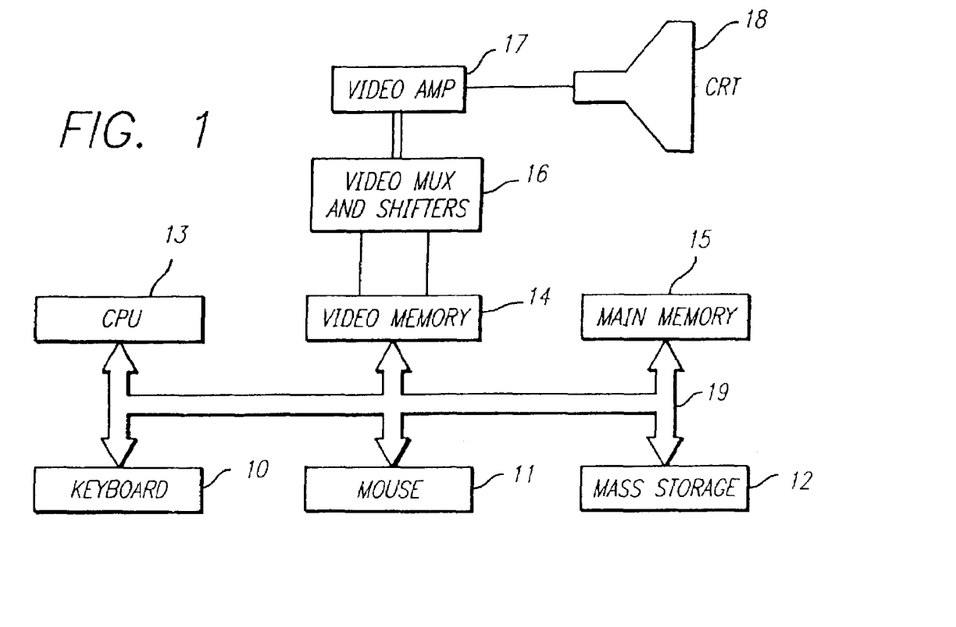
FIG. 1 is a block diagram of a computer system which can be used to practice the present invention.

The present invention may be implemented on any conventional or general purpose computer system. An example of one embodiment of a computer system for implementing this invention is illustrated in FIG. 1. A keyboard 10 and mouse 11 are coupled to a bi-directional system 19. The keyboard and mouse are for introducing user input to the computer system and communicating that user input to CPU 13. The computer system of FIG. 1 also includes a video memory 14, main memory 15 and mass storage 12, all coupled to bi-directional system bus 19 along with keyboard 10, mouse 11 and CPU 13. The mass storage 12 may include both fixed and removable media, such as magnetic, optical or magneto-optical storage systems or any other available mass storage technology. The mass storage may be shared on a network, or it may be a dedicated mass storage. Bus 19 may contain, for example, 32 address lines for addressing video memory 14 or main memory 15. The system bus 19 also includes, for example, a 32-bit data bus for transferring data between and among the components, such as CPU 13, main memory 15, video memory 14 and mass storage 12. Alternatively, multiplexed data/address lines may be used instead of separate data and address lines.

In the preferred embodiment of this invention, the CPU 13 is a 32-bit microprocessor manufactured by Motorola, such as the 68030 or 68040. However, any other suitable microprocessor or microcomputer may be utilized. The Motorola microprocessor and its instruction set, bus structure and control lines are described in MC68030 User's Manual, and MC68040 User's Manual, published by Motorola Inc. of Phoenix, Ariz. Main memory 15 is typically comprised of random access memory (RAM) and in the preferred embodiment of this invention, comprises 8 megabytes of memory. More or less memory may be used without departing from the scope of this invention. Video memory 14 is a dual-ported video random access memory (RAM), and in this invention consists, for example, of 256 kbytes of memory. However, more or less video memory may be provided as well. One port of the video memory 14 is coupled to video multiplexer and shifter 16, which in turn is coupled to video amplifier 17. The video amplifier 17 is used to drive the cathode ray tube (CRT) raster monitor 18. Video multiplexing shifter circuitry 16 and video amplifier 17 are well known in the art and may be implemented by any suitable means. This circuitry converts pixel data stored in video memory 14 to a raster signal suitable for use by monitor 18. Monitor 18 is a type of monitor suitable for displaying graphic images. The computer system described above is for purposes of example only. The present invention may be implemented in any type of computer system or programming or processing environment.

The preferred embodiment of the present invention implements an object-oriented programming language such as the objective C language. Objective C is an extension to ANSI C that supports the definition of classes of objects and provides syntactic and run-time support for sending messages to objects. This language model is partially derived from SmallTalk and has bean described in "Object-Oriented Programming; An Evolutionary Approach," Brad J. Cox, Addison-Wesley 1986 and in "SmallTalk-80: The Language and its Implementation," Adele Goldberg, Dave Robson, Addison-Wesley 1983. Further, in its preferred embodiment, the present invention is implemented in a computer system using an object-oriented operating system. One such object-oriented operating system is known as the "Mach" operating system and is implemented in software sold by NeXT, Inc., the Assignee of the present invention, for use on "PC" hardware and other computers sold by various manufacturers (for example, Hewlett Packard and Sun Microsystems). The Mach operating system is an object-oriented operating system that supports distributed programming. It is a multitasking operating system kernel, allowing multiple, independent "tasks," which provide the basic environment of a program. Mach supports message-passing within and between tasks.

Overview of the Present Invention

Figure 2A:
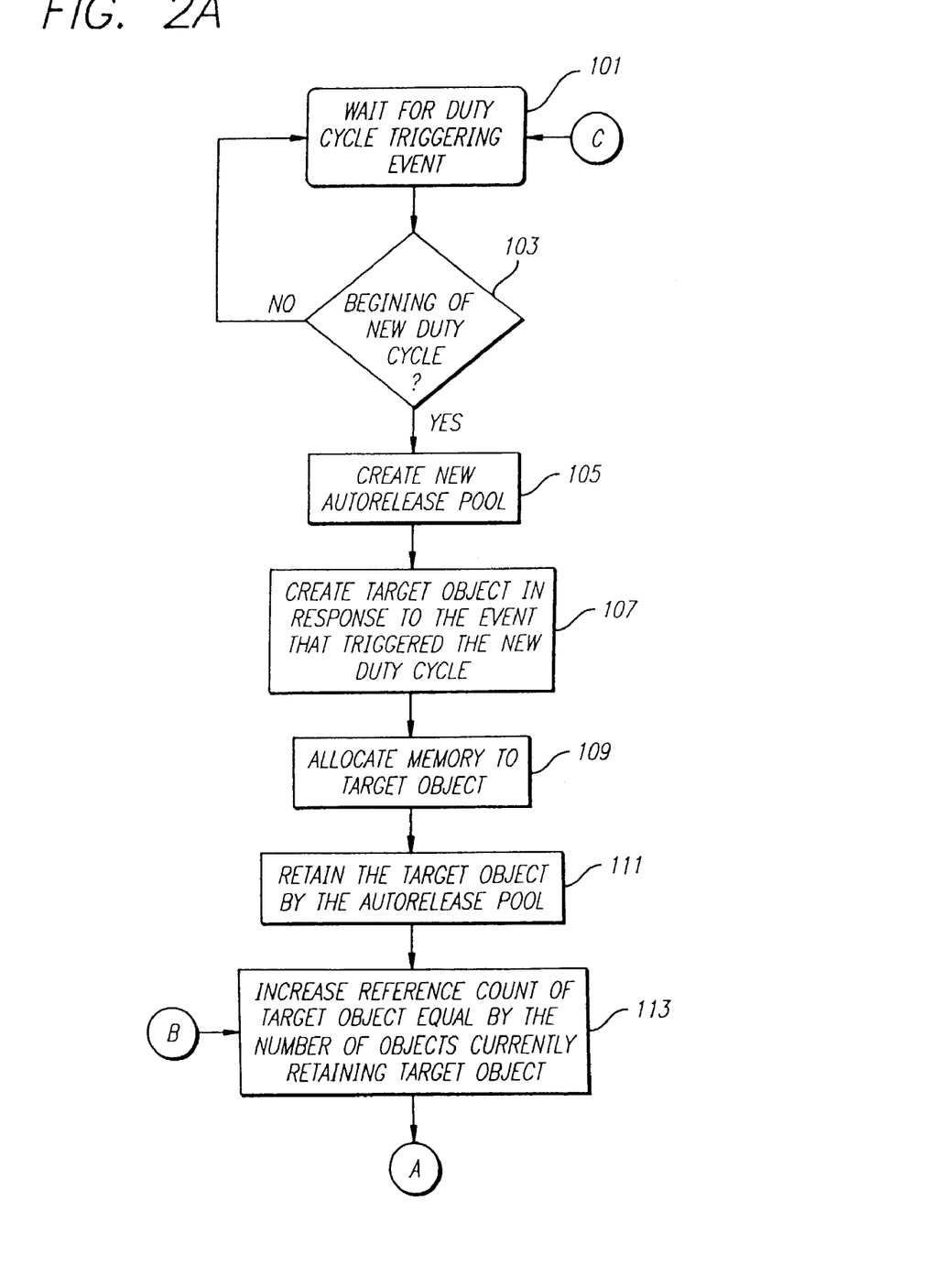
FIGS. 2A and 2B are flow diagrams illustrating an overview of the present invention.
Figure 2B:
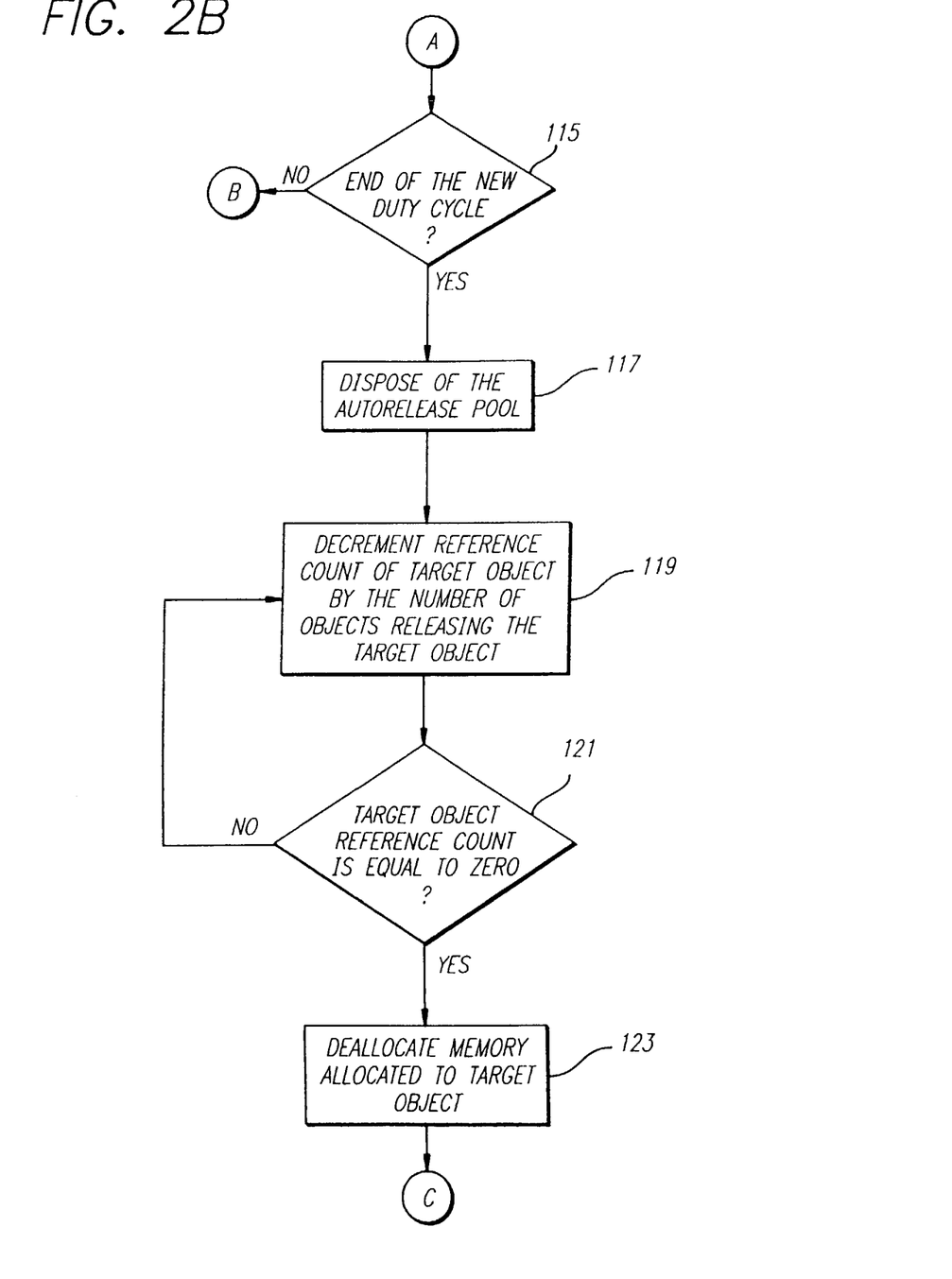

The flow diagram of FIGS. 2A and 2B is an overview of the transparent local and distributed memory management system of the present invention. In step 101, the system of the present invention awaits an event that triggers a "duty cycle." A duty cycle is a term that refers to a period of activity of an application program, which is followed by a period of inactivity. For example, in a local application having a windowing interface, a new duty cycle is triggered in response to a user input, such as press of a key, mouse, or button. As another example, in a distributed network a new duty cycle is triggered when a remote machine has asked a local machine to perform an activity on behalf of the remote machine. The invention makes use of these "naturally occurring" duty cycles for creating a new object called the "autorelease pool" (also referred to as "autorelease object" or "autorelease program" in this application). As shown in step 103 if a new duty cycle is triggered, a new autorelease pool is created (step 105), otherwise the system awaits an event that triggers a new duty cycle (step 101).

In step 107 an object (called a target object) is created in response to the event triggering the duty cycle. For example, in response to a mouse press (the triggering event), an object necessary to display a pop up menu is created by, for example, executing a subroutine. In step 109, memory space, typically a space in RAM belonging to the task during which the mouse event has occurred, is allocated to store the target object. In step 111, the new autorelease pool created in step 105 "retains" the target object. An object, such as the autorelease pool, can retain another object, such as the target object, by holding a pointer to that object. A pointer, also called an "ID," is the address at which an object is located. Thus, the autorelease pool retains the target object by remembering the target object's address. Conversely, the target object keeps a count, called a "reference count," indicating the number of objects that are currently retaining the target object (step 113). Thus, during the course of a duty cycle, the reference count kept by the target object is equal to or greater than one since at least one object (i.e., the autorelease pool) retains the target object. If, during the course of the duty cycle, other objects also retain the target object, then the reference count would be greater than one.

The duty cycle is complete when the activity of the computer system in response to a triggering event, such as a mouse press, has ended. If the duty cycle is complete (step 115), the autorelease pool is automatically disposed of (step 117). As a result, there is no longer an autorelease pool retaining the target object and thus the reference count kept by the target object is decremented by one. However, other objects that have "retained" the target object may have also "released" it (i.e. are no longer retaining the target object). In that case, for each object that has released the target object the reference count is decremented by one (step 119). At step 121 the system checks to see if the reference count is equal to zero. If so, the RAM space allocated to the target object is deallocated (step 123). In other words, the target object is deleted from the memory space of the task during which the mouse event occurred. If the reference count is not equal to zero, the target object remains in the memory space of the current task until no object is retaining the target object. Thus, the system continually checks the reference count until the reference count is equal to zero, at which point the memory space allocated to the target object is deallocated.

The deallocation of memory space is accomplished without the programmer keeping track of whether the newly created object (i.e., the target object) is still needed by the subroutine that created the target object, or by other objects that had retained the target object. Accordingly, the memory management of the present invention is accomplished transparent to the programmer. The present invention is described in more detail below.

Memory Management by the Present Invention in a Local Case

Figure 3:
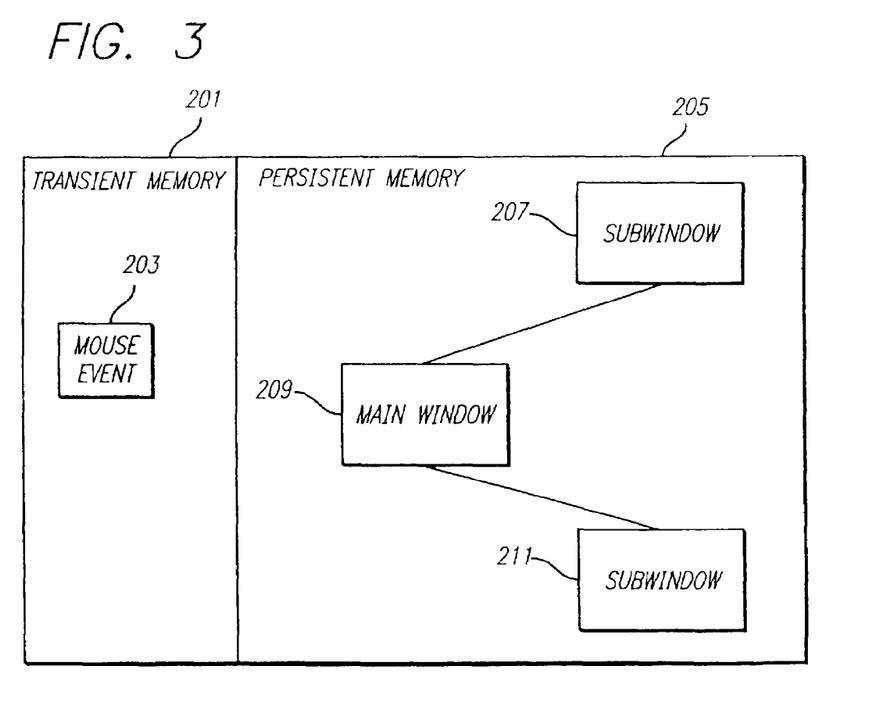
FIGS. 3–5 show an example of the arrangement of the memory space of an image of a task processing a new duty cycle.
Figure 4:
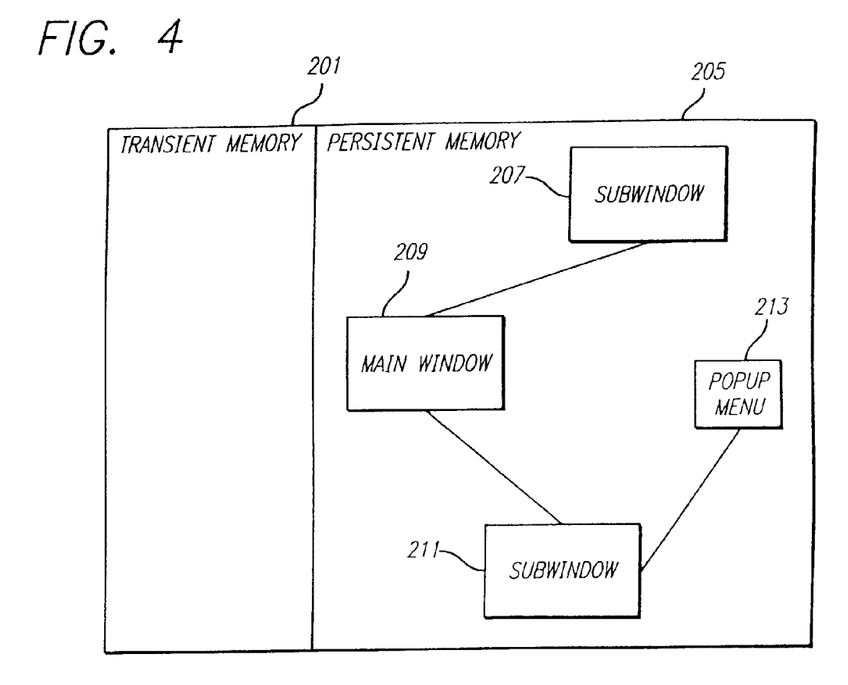

FIG. 3 shows the organization of memory comprising an "image" of a current task in a local machine (each task has a distinct view of the RAM space of a machine; this distinct view of memory is called the "image" of that task). As an example of an event triggering a new duty cycle in a local machine is mouse event 203. Mouse event 203 is, for example, a mouse press triggering display of a pop up menu on an active window of a local application. The mouse press thus triggers a new duty cycle which is the cycle in which the application recalls the pop up menu and displays it on the screen. The mouse event is transient (and belongs to "transient memory" 201 shown in FIG. 3) and is thus disposed of at the end of the duty cycle, namely, when the pop up menu is displayed on the screen. Thus, keeping track and disposing of the mouse event by itself is a relatively simple matter. The image of the current task also includes "persistent memory" 205 which typically lasts longer than the duty cycle trigged by mouse event 203. Persistent memory 205 may include main window 209, subwindow 207, and subwindow 211. During the mouse event duty cycle, a subroutine in the application processes the mouse event and returns a pop up menu. One of the objects recalled in response to the mouse event and allocated to the image of the current task is pop up menu 213 shown in FIG. 4. Pop up menus typically belong to more persistent memory than does the mouse event since other objects, such as subwindow 211 shown in FIG. 4, may need to retain and display the pop up menu beyond the mouse event duty cycle. However, subwindow 211 did not recall or create the pop up menu object. Further, subwindow 211 may not even need the pop up menu object beyond the mouse event duty cycle. In the prior art, the programmer has the burden of keeping track of the memory space allocated to the pop up menu object.

In the present example, the programmer has to dispose of the pop up menu after constantly checking to ensure that the mouse event duty cycle has ended and that no other object is retaining the pop up menu. The autorelease pool of the invention overcomes this prior art difficulty by automatically retaining the pop up menu during the course of the mouse event duty cycle. At the end of the mouse event duty cycle, the autorelease pool is disposed of, causing an automatic release of the pop up menu if no other object is retaining the pop up menu. As such, transparent to the programmer, memory space allocated to the pop up menu is deallocated at the end of the mouse event duty cycle.

Figure 5:
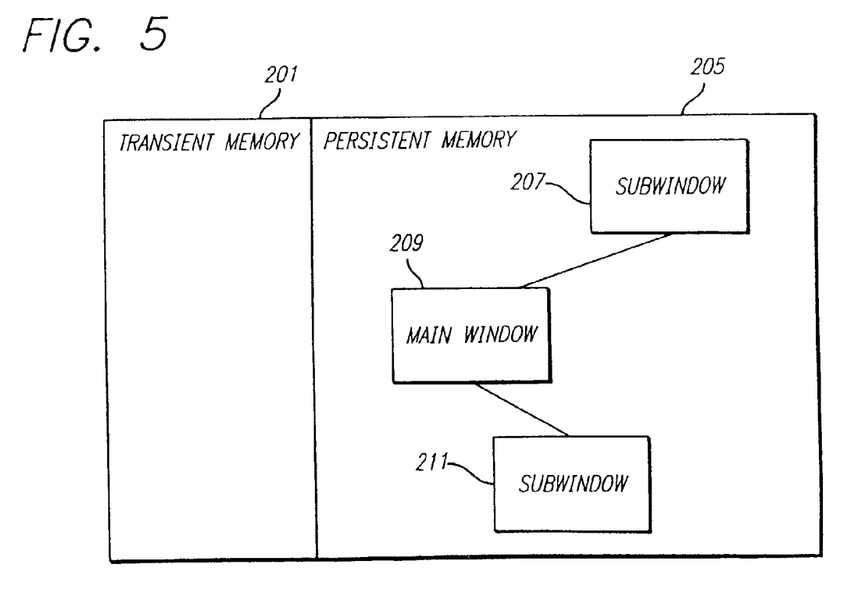

Thus as shown in FIG. 5, the persistent memory now comprises subwindow 207, main window 209, and subwindow 211 without pop up menu 213. However, if other objects, such as subwindow 211 in persistent memory 205, need to retain pop up menu 213 beyond the mouse event duty cycle, the pop up menu is not disposed of even though the autorelease pool is disposed of at the end of the mouse event duty cycle. Thus, again, without active involvement of the programmer, the invention permits retaining the pop up menu when other objects wish to retain the pop up menu beyond the mouse event duty cycle.

In another embodiment, the invention applies to any type of memory allocation whether or not a target object is involved. Further, the allocated memory space may be retained by any piece of code or any program as opposed to another object. For example, suppose that a string of data (as opposed to an object) making up title of a window is recalled and is allocated RAM space. A "window code" retains this string, in other words, the window code increments by one the reference count for that string. The window code may then perform an operation on the string of data such as changing all lower case letters to upper case letters. The string of upper case letters are kept beyond the duty cycle that invoked the lower case string since the upper case string is to be displayed as the title of the window.

At the beginning of the duty cycle that invoked the lower case string, an autorelease pool is created which holds a pointer to (i.e., retains) the lower case string. When the conversion of the lower case string to an upper case string is complete, in other words, at the end of the duty cycle that invoked the lower case string, the autorelease pool is disposed of. As a result, the reference count for the lower case string is reduced to zero and the memory space allocated to the lower case string is reclaimed without programmer involvement. Thus, the invention allows transparent reclamation of memory space allocated to non-objects as well as objects. The invention applies generally to reclamation of memory allocated in any situation where new memory space is allocated as a result of invocation of a routine, subroutine, procedure, or any program that requires temporary use of RAM space.

Memory Management by the Invention in a Distributed Network Case

Figure 6:
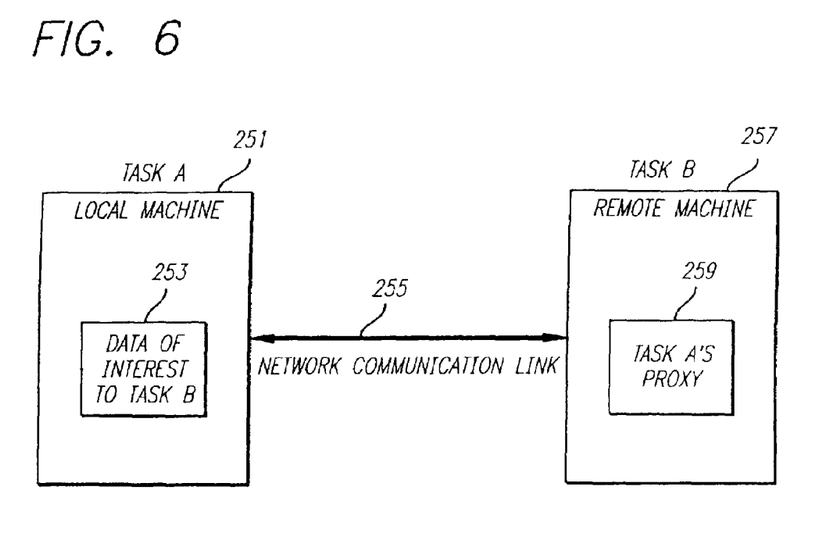
FIG. 6 shows an example of a distributed network in which the present invention is practiced.

The general problem in reclaiming memory allocated as a result of a network activity is illustrated in FIG. 6. Suppose that task A is running on local machine 251 while task B is running on remote machine 257. Task B needs to invoke a subroutine that needs data residing in task A's image (it is recalled that task A's image is the view of RAM as seen by task A). This data of interest to task B is shown by block 253 in FIG. 6. Task B requests task A's proxy (i.e., proxy 259 in FIG. 6 which resides in task B) to invoke a subroutine on task A. Task A's proxy 259 forwards the request to invoke the subroutine to task A over network communication link 255. Task A runs the subroutine on "data of interest to task B" 253 and returns the result to task B over network communication link 255. However, as a consequence of running this subroutine, some memory space in task A gets allocated to the result of the subroutine. This memory space is allocated in response to task B's request from a remote machine. According to the prior art, task A cannot readily reclaim this memory space because task A must ensure that task B no longer needs to access this memory space which contains the result of the subroutine run in response to the call from a remote machine. On the other hand, nor can task B readily reclaim this memory space. One difficulty is that the programming conventions of remote machine 257 and local machine 251 can be different. Furthermore, task B also needs to ensure that task A no longer needs the memory space allocated to the result of the subroutine run. Thus, the prior art's programmer has to continually keep track of various codes and objects that may need the memory space allocated to the result of the subroutine prior to deallocating (i.e., reclaiming) that memory space.

The present invention overcomes this difficulty of the prior art. According to the present invention, an autorelease pool keeps track of the memory allocated by task A in response to the subroutine call by task B. An autorelease pool is created at the beginning of the duty cycle which is the time at which task B requests task A's proxy to invoke a subroutine on task A. At this time, the autorelease pool holds a pointer to the memory allocated by task A for the result of the subroutine. At the end of the duty cycle, namely when a copy of the result is forwarded to task B, the autorelease pool is disposed of. As a consequence, the reference count kept in the memory allocated to the result of the subroutine is decremented by one. If no other object in task A or task B is currently retaining the result of the subroutine, the reference count would now be equal to zero. As a result, the memory allocated to the result of the subroutine can now be safely reclaimed transparent to the programmer and regardless of different programming conventions that may exist on remote machine 257 and local machine 251. According to the prior art, the programmer has no transparent mechanism for supplying such a method for reclaiming the allocated memory. The prior art convention of "caller releases" forces all subroutine suppliers to yield results with "extra references." This results in loss of efficiency and transparency.

Figure 7A:
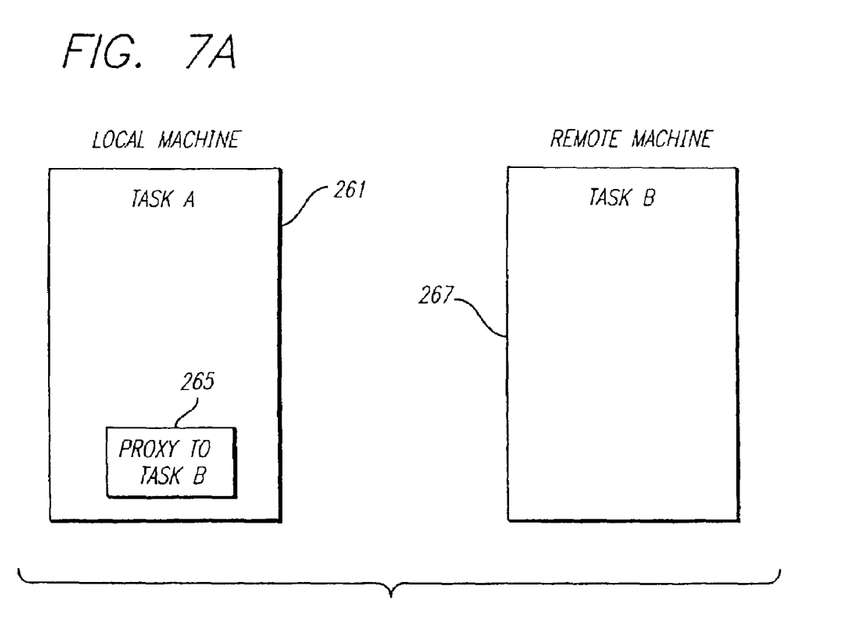
FIGS. 7A–7E show an application of the present invention in a distributed network case.
Figure 7B:
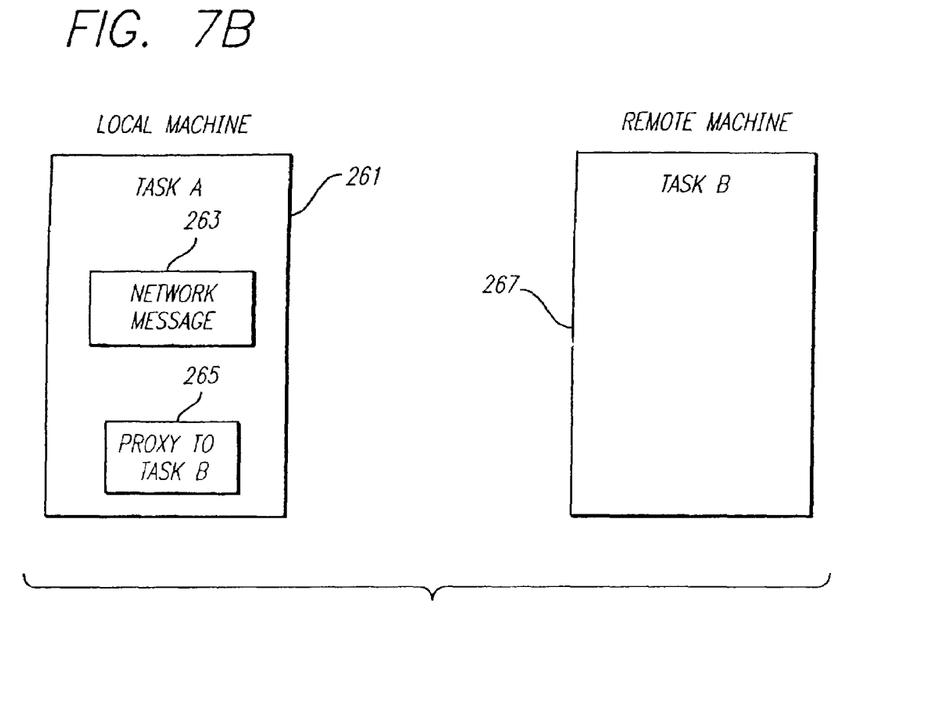
Figure 7C:
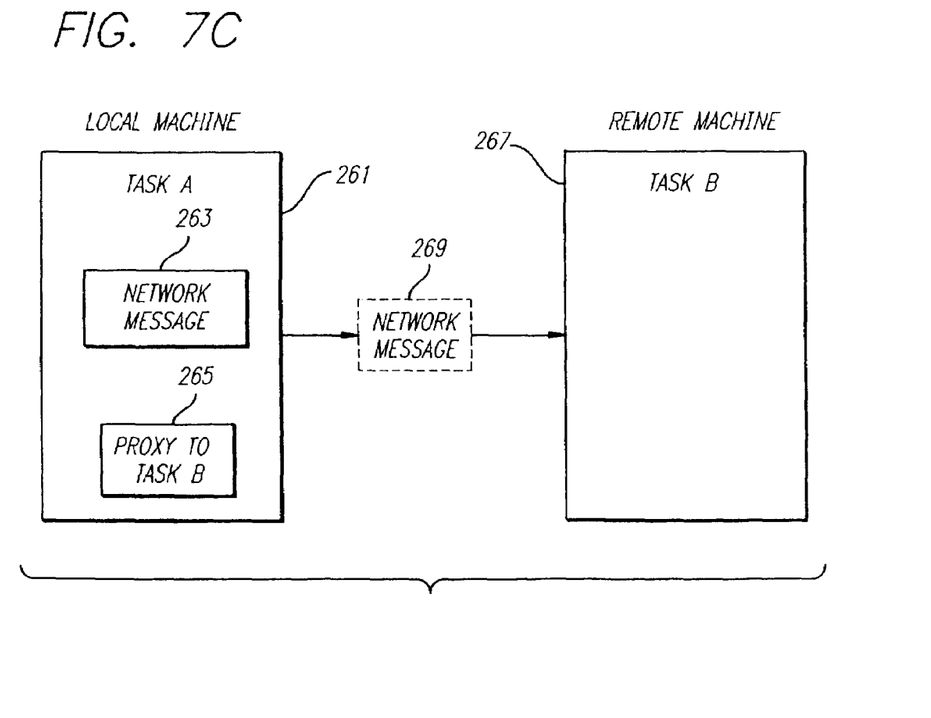

Referring to FIGS. 7A through 7E, consider another example of how the present invention operates in a distributed network environment. As shown in FIG. 7A, task A is run on local machine 261 and task B on remote machine 267. Task A holds a proxy 265 to task B. Task A initiates a "remote procedure call" to task B by requesting proxy 265 to forward a network message to task B. (A remote procedure call is a convenient method of using the network communication link (not shown in FIGS. 7A through 7E) between local machine 261 and remote machine 267. The invention is not restricted to, or dependent upon, using a remote procedure call).

When the remote procedure call is initiated by task A, a new duty cycle begins, and the network message (network message 263 in FIG. 7B) is created, and an autorelease pool (not shown) is also created which holds a pointer to network message 263. Then a copy of network message 263 (shown as network message 269 in FIG. 7C) is passed across the network communication link to remote machine 267. The network message gets copied into task B of remote machine 267. This copy is shown as network message 271 in FIG. 7D.

Figure 7D:
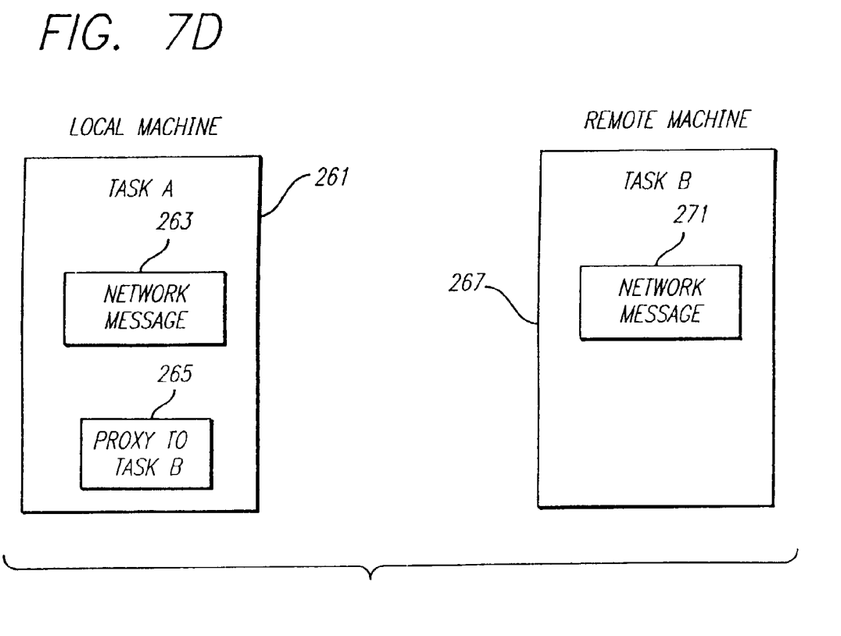

Task B creates its own autorelease pool (not shown) in response to receiving the network message which is the beginning of a new duty cycle for task B. This autorelease pool holds a pointer to network message 271. Task B then performs the procedure called for by task A and returns the result of this procedure to task A. The steps necessary to perform the procedure and the return of the result of the procedure to task A are not shown in the Figures and are not discussed here to preserve simplicity.

After the network message has reached task B, and copied to it, the duty cycle of task A triggered by the remote procedure call ends. Accordingly the autorelease pool in task A that pointed to network message 263 is disposed of. Consequently, the memory space in task A occupied by network message 263 is reclaimed. At the other end, when the result of the procedure called for by task A is returned to that task by task B, the duty cycle that began when network message 271 was received by task B ends. Accordingly the autorelease pool in task B that pointed to network message 271 is disposed of. Consequently, the memory space in task B occupied by network message 271 is reclaimed.

Figure 7E:
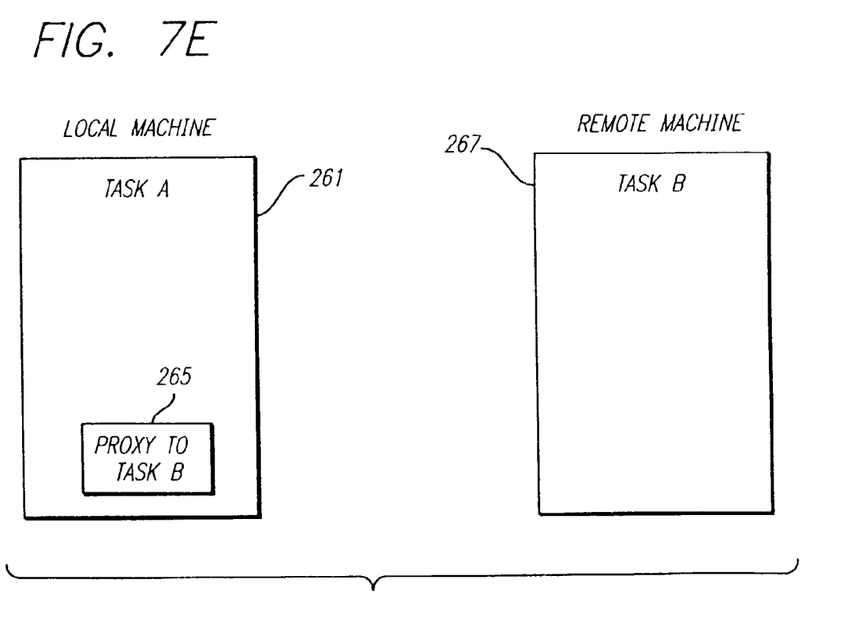

As shown in FIG. 7E, both task A and task B are left with the same memory state that existed before the network message was created. Therefore, according to our invention, the mechanisms that are used to distribute objects, such as the network message, do not have to keep track of all the memory that is being allocated to the distributed objects in the various machines in the network: All of the memory reclamation processes are accomplished transparent to the programmer.

As another example of how the present invention operates in a distributed network, suppose that the procedure that was invoked by the network message in the above example required task B to build a "color object"; an object whose only notion is that the object represents a certain color, for example the color red. The result of the subroutine, namely the color object, is then returned to task A, in other words the color object is copied from task B to task A. At the end of the duty cycle of task B, i.e., when the color object is returned to task A, the autorelease pool in task B that pointed to the color object is disposed of. Accordingly, if no other objects are currently retaining the color object in task B, the memory space in task B which is allocated to the color object is reclaimed. Again, the memory space is reclaimed without active programmer involvement.

As another variation of the above example, suppose that instead of task B supplying A with a copy of the color object, task B supplies task A with a proxy to the color object. In this case, the autorelease pool created by the invention holds a reference (in fact, the only reference) to the new color object in task B. If the proxy to the color object is not retained by the end of task A's present duty cycle, the proxy to the color object is released and a network message is sent to release the color object built in task B. To the programmer, the behavior of the distributed system is as if task A and task B were both local tasks, or that task A and task B were one indistinguishable task. Thus, whether task B supplies a copy of the color object to task A, or task B supplies task A with a proxy of the color object, according to the present invention a programmer transparent mechanism recovers the memory allocated by either task A or task B.

In one embodiment, the invention obviates the need for an additional network message indicating that a certain memory space has been reclaimed by one of the machines in the network. This is accomplished by "piggybacking" a memory status message on the main object or message passed across the network. For example, suppose that in the above example of the color object, task B needed to inform task A that the memory space that task B allocated to the color object has been reclaimed. In the prior art, after the color object was returned to task A and after task B had reclaimed the memory space in task B allocated to the color object, task B sends a follow up network message to task A that the memory space in task B has in fact been reclaimed.

In contrast, according to the invention, when task B returns the color object to task A, task B piggybacks a message sent along with the color object; the message indicates that the only object currently retaining the color object in task B is the autorelease pool. Accordingly, when task A receives the color object from task B, task A would also know that at the end of task B's duty cycle (i.e., when the color object was returned to task A) task B reclaimed the memory space in task B allocated to the color object. Thus, the invention overcomes the prior art's need for sending a follow up message from task B to task A indicating that the memory space was reclaimed by task B.

Structure of an Individual Autorelease Pool

Figure 8:
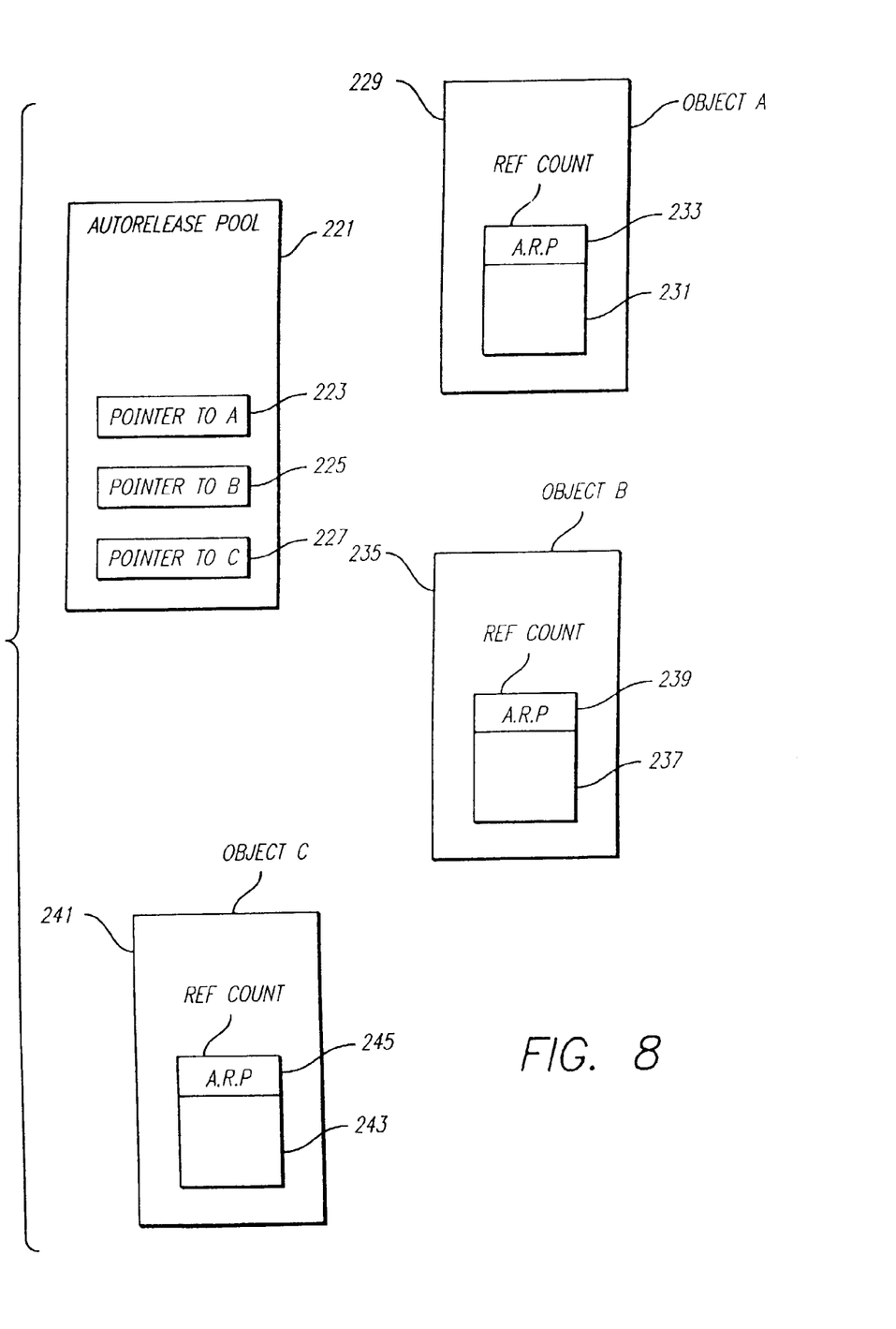
FIG. 8 shows the structure of an autorelease pool according to the present invention.

The autorelease pool of the present invention is typically a standard object. FIG. 8 shows an example of the invention's autorelease pool. Autorelease pool 221 contains pointers to or addresses (also called "ID's") of other objects. Pointer to A (223), pointer to B (225), and pointer to C (227) are examples of pointers that the autorelease pool holds to object A (229), object B (235), and object C (241), respectively. Each pointer in autorelease pool 221 typically occupies between four and thirty two bytes of memory. The objects to which pointers are held by the autorelease pool are those that are created typically as a result of invocation of a subroutine either locally, or from a remote machine in a network. According to the invention, the event triggering a new duty cycle also triggers creation of a new autorelease pool, and the addition of the new autorelease pool to a stack of autorelease pools. Each object that is recalled from a data base and which is allocated RAM space (also referred to as a "target object" in this application) keeps a "reference count" which indicates the number of objects that are currently retaining that object. Thus, as a result of the invention's autorelease pool holding a pointer to (i.e., retaining) a target object, the retained target object increments its reference count by one, indicating that one more object, namely the autorelease pool, currently retains the target object. As such, according to our invention, as soon as a target object is allocated RAM space, the reference count kept by the target object becomes equal to or greater than one since at least one object.(i.e., the autorelease pool) retains the target object. As shown in FIG. 8, object A (229), keeps a reference count 231, where one count corresponds to autorelease pool 221, shown as "A.R.P." 233. Likewise, object B (235) keeps a reference count 237, where one count corresponds to autorelease pool 221, indicated by "A.R.P." 239. Object C (241) also keeps a reference count 243 with one count corresponding to autorelease pool 221, shown as "A.R.P." 245.

Creation of the Autorelease Pool

In both local and distributed network cases, autorelease pools are created in response to major and minor duty cycles. At the beginning of each duty cycle a new autorelease pool is created, and each duty cycle has its own autorelease pool. Thus, during the course of running a task a number of nested autorelease pools exist that correspond to various duty cycles. Accordingly, every task has a set of nested autorelease pools in the task's image in the RAM. The set of nested autorelease pools are arranged in a stack. The newest autorelease pools are added to the top of the stack, and are recalled therefrom. Access to the stack is made via a "global subroutine."

In general, any piece of code can create the autorelease object. In a preferred embodiment, a code that manages input from users or from other machines in a network (also called an "input managing code" in this application) is responsible for creation of the autorelease pool. The input managing code detects events that indicate a new duty cycle must begin (examples of such events were given above). The input managing code has a "WHILE LOOP" that continually checks for activity that indicates the beginning of a new duty cycle. When the input managing code detects duty cycle triggering activity, the code creates an autorelease pool and awaits end of the duty cycle. At the end of the duty cycle the input managing code disposes of the autorelease pool that was created as a result of that duty cycle. The input managing code of any task that wants to create a new autorelease pool would invoke this global subroutine which creates a new autorelease pool for the requesting task. Once a new autorelease pool is created for the requesting task, a message called "Add Object" is invoked to register objects for use in that duty cycle.

Another way that the input managing code can use an autorelease pool is by having an object that was created due to the new duty cycle (in other words, the object that is to be deallocated at the end of the duty cycle) invoke an "autorelease subroutine." By invoking this subroutine, the autorelease pool at the top of the autorelease pool stack retains (and later releases) the object invoked due to the new duty cycle. As an example, suppose that in the case discussed above with respect to displaying a pop up menu in a window, an object "pop up" is created as a result of the new duty cycle. It is recalled that the new duty cycle is detected by the input managing code in response to the user input, for example, a mouse press. It is then desired to have the new autorelease pool hold a pointer to that object. The following Objective C code is an example of how this can be accomplished.

```
popup*pop=[popup alloc]; /* allocate memory space to
   the pop up object*/
[popup autorelease];
   /* have the autorelease pool hold a pointer (i.e., retain)
   the pop up object */
return pop;
```

As before, at the end of the duty cycle that was triggered by the mouse press, the autorelease pool holding a reference to the pop up object is disposed of.

The invention frees a programmer from the prior art's tedious and error-prone requirement of keeping track of whether memory space allocated to a target object needs to be reclaimed (i.e., deallocated) when the subroutine calling the target object no longer needs that object. Consider an example of the application of our invention to a case involving nested duty cycles. Suppose during a major duty cycle which involves display of a window on a screen, a minor duty cycle consists of a mouse press for opening a panel on the current window. However, the panel may already be open due to some other activity which would last beyond the mouse press duty cycle. In that case, the prior art programmer had to keep track of whether the panel was already open and distinguish that case from a case where the panel is not already open. In the former case, the programmer needs to ensure that the memory space allocated to the panel is not reclaimed at the end of the mouse press duty cycle. In the latter case, the programmer needs to reclaim the memory space allocated to the panel since the panel is no longer needed. As the number of nested major and minor duty cycles increases, the prior art programmer has to keep track of an increasing number of possibilities.

Our invention has overcome these difficulties. According to our invention, a reference to the target object, in this case the "open panel" object, is held by the autorelease pool. The autorelease pool is created at the beginning of the mouse press duty cycle and is disposed of at the end of that duty cycle. Thus, if no panel is already open, the reference count of the open panel object is decremented to zero at the end of the mouse press duty cycle due to the disposal of the autorelease pool. Accordingly, at the end of the mouse press duty cycle, the memory space allocated to the open panel object is reclaimed transparent to the programmer. However, if a window panel is already open, and is to remain open beyond the life of the mouse press duty cycle, the disposal of the autorelease pool does not result in reducing the reference count of the open panel object to zero. The reference count of the open panel object remains greater than zero since an object, in addition to the autorelease pool, has been retaining the open panel object. Accordingly, at the end of the mouse press duty cycle, the memory space allocated to the open panel object is not reclaimed. This is also achieved transparent to the programmer.

Thus, a transparent local and distributed memory management system has been described.

The invention claimed is:

1. A method for transparently managing memory allocation in a computer comprising:
   receiving a trigger indicating start of an activity phase of an event's duty cycle in a computer, wherein a duty cycle comprises an activity phase and an inactivity phase;
   creating an autorelease pool based on said trigger for said event;
   creating a target object in response to said event;
   retaining said target object in said autorelease pool during said activity phase of said duty cycle; and
   disposing of said autorelease pool at conclusion of said activity phase of said duty cycle.

2. The method of claim 1, wherein said creating a target object comprises:
   creating a target object based on said trigger; and
   allocating memory space to said target object.

3. The method of claim 1, wherein said retaining said target object in said autorelease pool comprises said autorelease pool retaining a pointer to said target object.

4. The method of claim 1, wherein said target object maintains a count of objects retaining its pointer.

5. The method of claim 4, wherein said target object is destroyed when said count is zero.

6. The method of claim 1, wherein said disposing of said autorelease pool comprises releasing said target object.

7. The method of claim 1, wherein said event is an application program.

8. The method of claim 1, wherein said event is in response to a user input.

9. The method of claim 1, wherein said event originates in response to a remote computer.

10. A computer program product comprising:
    a computer usable medium having computer readable code embodied therein for transparently managing memory allocation, said computer program product comprising computer readable code configured to cause a computer to:
    receive a trigger indicating start of an activity phase of an event's duty cycle in a computer, wherein a duty cycle comprises an activity phase and an inactivity phase;
    create an autorelease pool based on said trigger for said event;
    create a target object in response to said event;
    retain said target object in said autorelease pool during said activity phase of said duty cycle; and
    dispose of said autorelease pooi at conclusion of said activity phase of said duty cycle.

11. The computer program product of claim 10, wherein said create a target object comprises computer readable code configured to cause a computer to:
    create a target object based on said trigger; and
    allocate memory space to said target object.

12. The computer program product of claim 10, wherein said retain said target object in said autorelease pool comprises said autorelease pool retaining a pointer to said target object.

13. The computer program product of claim 10, wherein said target object maintains a count of objects retaining its pointer.

14. The computer program product of claim 13, wherein said target object is destroyed when said count is zero.

15. The computer program product of claim 10, wherein said dispose of said autorelease pooi comprises releasing said target object.

16. The computer program product of claim 10, wherein said event is an application program.

17. The computer program product of claim 10, wherein said event is in response to a user input.

18. The computer program product of claim 10, wherein said event originates in response to a remote computer.

* * * * *